United States Patent
Salonen et al.

(10) Patent No.: US 9,746,328 B2
(45) Date of Patent: Aug. 29, 2017

(54) GENERATION OF UNDERWATER NAVIGATIONAL INFORMATION

(71) Applicant: ARIADNA TECH OY, Lahti (FI)

(72) Inventors: Jyrki Salonen, Lahti (FI); Pasi Lahtinen, Pirkkala (FI)

(73) Assignee: ARIADNA TECH OY, Lahti (FI)

( * ) Notice: Subject to any disclaimer, the term of this patent is extended or adjusted under 35 U.S.C. 154(b) by 0 days.

(21) Appl. No.: 15/024,516

(22) PCT Filed: Jun. 27, 2014

(86) PCT No.: PCT/FI2014/050531
§ 371 (c)(1),
(2) Date: Mar. 24, 2016

(87) PCT Pub. No.: WO2015/197907
PCT Pub. Date: Dec. 30, 2015

(65) Prior Publication Data
US 2016/0209215 A1    Jul. 21, 2016

(51) Int. Cl.
*G01C 21/12* (2006.01)
*G01C 21/14* (2006.01)
*B63C 11/02* (2006.01)

(52) U.S. Cl.
CPC .............. *G01C 21/12* (2013.01); *B63C 11/02* (2013.01); *B63C 2011/021* (2013.01)

(58) Field of Classification Search
None
See application file for complete search history.

(56) References Cited

U.S. PATENT DOCUMENTS 5,570,323 A * 10/1996 Prichard ................. G01S 15/74
  367/118
6,029,515 A *  2/2000 Lahteenmaki .......... B63C 11/02
  73/178 R (Continued)

FOREIGN PATENT DOCUMENTS

EP        1 870 139 A1    12/2007
WO     2010/090867 A2     8/2010

OTHER PUBLICATIONS

Seifert L et al.: "Arm coordination, power, and swim efficiency in national and regional front crawl swimmers", Human Movement Science, North-Holland, Elseveir Science, Amsterdam, NL, vol. 29, No. 3, Jun. 1, 2010 (Jun. 1, 2010), pp. 426-439, XP027044066, ISSN: 0167-9457 [retrieved on Apr. 28, 2010] Introduction.

(Continued)

*Primary Examiner* — Krishnan Ramesh
(74) *Attorney, Agent, or Firm* — Young & Thompson (57) ABSTRACT

An apparatus, a system, and method for generating underwater navigational information includes receiving data from a user, obtaining inertial data from inertial sensors, producing an estimation of a propulsion power by the user at a predetermined points of time by calculations at least partly based on the obtained inertial data, a hydrodynamic coefficient is calculated for the user at least partly based on the input data by the user, a velocity of the user is calculated at least partly on a basis of the estimated propulsion power and the determined hydrodynamic coefficient, heading information of the user at the predetermined points of time is calculated from the obtained inertial data, the calculated velocity information is combined with the calculated heading information at corresponding points of time and navigational information is generated.

18 Claims, 4 Drawing Sheets

(56) References Cited

U.S. PATENT DOCUMENTS

| | | | | |
|---|---|---|---|---|
| 6,807,127 B2* | 10/2004 | McGeever, Jr. | ........ | B63C 11/26 367/128 |
| 2002/0140599 A1* | 10/2002 | King | ................ | B63C 11/26 342/357.57 |
| 2004/0022129 A1* | 2/2004 | McGeever, Jr. | ........ | B63C 11/26 367/128 |
| 2012/0022820 A1* | 1/2012 | Schmitz | ................ | G01C 21/165 702/95 |
| 2013/0257621 A1* | 10/2013 | Juergensen | ............. | B63C 11/02 340/626 |
| 2014/0099615 A1* | 4/2014 | Sweeney | .............. | A61B 5/7405 434/254 |

OTHER PUBLICATIONS

M. A. Passmore et al.:"Drag levels and energy requirements on a SCUBA diver", Sports Engineering, vol. 5, No. 4, Nov. 1, 2002 (Nov. 1, 2002), pp. 173-182, XP055147143, ISSN: 1369-7072, DOI: 10.1046/.1460-2687.2002.00107.x the whole document.
International Search Report, dated Oct. 27, 2014, from corresponding PCT application.

* cited by examiner

GENERATION OF UNDERWATER NAVIGATIONAL INFORMATION

TECHNICAL FIELD

The example and non-limiting examples of the present invention relate to underwater activities, like scuba diving, and especially to a solution for generating navigation information thereto.

BACKGROUND

Underwater activities, like scuba diving, are gaining more and more popularity. In scuba diving equipment play an important role in enabling the underwater adventures. The diving equipment may be categorized to several bigger groups: breathing related equipment, mobility related equipment, underwater vision equipment and monitoring and navigation related equipment. The breathing equipment comprises e.g. breathing gas tank and one or more regulators providing air, or some other gas, to the diver. Mobility related equipment comprise e.g. suit, fins and buoyancy control devices, such as buoyancy compensator. Underwater vision equipment, in turn, comprise such as diving mask and dive lights. Monitoring and navigation related equipment comprise devices such as dive computers which provide information to the diver as relates to dive time, depth and the subsequent decompression status based on the amount of dissolved inert gasses in the diver's body, amount of gas(es) in the breathing gas tank(s), and positional or heading information, for instance. Thus, the monitoring and navigation related equipment may for example comprise one or more gauges and compass coupled to the other equipment in a known manner in order to provide the information. The previous list of scuba divers' equipment is not comprehensive and it may depend on the environment and purpose of the diving, e.g. recreational or professional.

The underwater navigation is one of the most challenging tasks to do during the dive regardless of diver's skills or experience. There are several reasons causing challenges to the navigation task, such as human sensory system cannot completely adapt to underwater environment, visibility under the water is more or less limited, there are many tasks concurrently going on during the dive and navigation does not get the attention required, limitations of the equipment and so on.

Traditionally, the underwater navigation is based on a use of compass and the diver mentally creates a spatial map based on the compass information.

Additionally, the divers may derive some distance information by counting kick-cycle every time the diver kicks with one particular leg and evaluating the propagation distance per kick, or kick cycle. Thus, the total distance is evaluated with a great uncertainty. A rough level of navigation may be achieved by combining the compass information with the manually calculated distance information. The manual navigation based on a use of compass and counting kick-cycles demands a great deal of uninterrupted attention in underwater environment and is often hampered when the diver attention is needed elsewhere.

Some other approaches for underwater navigation are also taken. First one is a utilization of ultrasound based systems. Typical ultrasound based underwater navigation device consists of a diver unit worn on the user's wrist, or carried as a separate hand held device, and a transceiver unit. The transceiver unit is often embodied as a statutory "homing" instrument that is placed in the water at the entry point. These systems use algorithms that control relaying of coded or non-coded ultrasonic signals between the two devices while simultaneously performing all direction and distance calculations. Second type of underwater navigation solutions are based on a cable communication between a surface float and a diver. The location information obtained by a satellite navigation GPS receiver equipped surface float is dispatched to the diver by the means of an underwater cable, thus enabling underwater navigation to some extent.

All these solutions suffer from technical or safety shortcomings. First, their dependence on a buoy support curbs their operation range and the usage of underwater cable entails a risk of entanglement which is a safety concern itself. Second, a need for the line-of-sight in use of ultrasound systems limits them to open water diving applications and achieving a high overall reliability is compromised for a number of reasons. Sea water is not uniform in pressure, temperature or salinity which all have an important effect on underwater sound propagation at angles relative to the buoy. A thermocline layer in the sea water can act as a horizontal waveguide for sound wave and can create a total blockage for the sound signal between the surface and the bottom. Combined with problems of triangulating from a small floating raft, the task of reaching mandatory reliability and accuracy becomes even more challenging. At their best, ultrasound navigation systems are only able to provide the range and bearing to the homing device which limits their potential as true navigation devices. Finally, ultrasound based devices tend to be bulky, power hungry and generate ultrasound noise potentially harmful to marine life.

Thus, there is need to develop solution for underwater navigation which at least partly mitigate the drawbacks of the known solutions.

SUMMARY

According to an example embodiment, a method for generating underwater navigational information is provided, the method comprising receiving input data from a user; obtaining inertial data from inertial sensors; calculating an estimation of a propulsion power produced by the user carrying the apparatus at a predetermined points of time at least partly based on the obtained inertial data; calculating a hydrodynamic coefficient for the user at least partly based on the input data by the user; calculating a velocity of the user at least partly on a basis of the estimated propulsion power and the determined hydrodynamic coefficient at the predetermined points of time; calculating heading information of the user at the predetermined points of time from the obtained inertial data; and generating navigational information at least by combining the calculated velocity information with the calculated heading information at corresponding points of time.

The calculation of the estimation on the propulsion power may comprise a step of recognizing a swimming kick type performed by the user based on acceleration information obtained from inertial data.

The method may further comprise a step of setting a ground referenced velocity measurement value to zero in response to detection of an activation of zero velocity compensation mode.

The method may further comprise a step of compensating an effect of a sea current by measuring user's average swimming velocity and heading in response to an activation of the sea current compensation mode and summing the effect detected in the sea current compensation mode to velocity and heading information calculated on the basis of obtained inertial data.

According to another example embodiment, an apparatus for generating underwater navigational information is provided, the apparatus comprising at least one processor; and at least one memory including computer program code; the processor being configured to cause the apparatus at least to perform: receive input data from a user; obtain inertial data from inertial sensors; calculate an estimation of a propulsion power produced by the user carrying the apparatus at a predetermined points of time at least partly based on the obtained inertial data; calculate a hydrodynamic coefficient for the user at least partly based on the input data by the user; calculate a velocity of the user at least partly on a basis of the estimated propulsion power and the determined hydrodynamic coefficient at the predetermined points of time; calculate heading information of the user at the predetermined points of time from the obtained inertial data; and generate navigational information at least by combining the calculated velocity information with the calculated heading information at corresponding points of time.

The apparatus may be configured to receive information relating to diving equipment of the user as an input from the user.

The inertial sensors may comprise at least an accelerator sensor and a magnetometer.

The apparatus may be configured to calculate the estimation of the propulsion power by recognizing a swimming kick type performed by the user based on acceleration information obtained from accelerator sensor.

The apparatus may be configured to calculate the velocity of the user at a predetermined point of time with an equation:

$$v = \left(\frac{P_p}{c_T}\right)^{1/3},$$

where $P_p$ is the propulsion power estimate and $c_T$ is the hydrodynamic coefficient.

At least part of the inertial data may be configured to be obtained from an external device to the apparatus through a communication interface arranged in the apparatus.

The apparatus may be one of the following: a user device, a sensor unit.

According to another example embodiment, a system for generating underwater navigational information is provided, the system comprising a user device, and a sensor unit, wherein the user device and the sensor unit being communicatively coupled to each other and wherein the system is configured to: receive input data from a user; obtain inertial data from inertial sensors; calculate an estimation of a propulsion power produced by the user carrying the apparatus at a predetermined points of time at least partly based on the obtained inertial data; calculate a hydrodynamic coefficient for the user at least partly based on the input data by the user; calculate a velocity of the user at least partly on a basis of the estimated propulsion power and the determined hydrodynamic coefficient at the predetermined points of time; calculate heading information of the user at the predetermined points of time from the obtained inertial data; and generate navigational information at least by combining the calculated velocity information with the calculated heading information at corresponding points of time.

The system may be configured to receive information relating to diving equipment of the user as an input from the user.

The inertial sensors may comprise at least an accelerator sensor and a magnetometer.

The system may be configured to calculate the estimation of the propulsion power by recognizing a swimming kick type performed by the user based on acceleration information obtained from accelerator sensor.

The system may be configured to calculate the velocity of the user at a predetermined point of time with an equation:

$$v = \left(\frac{P_p}{c_T}\right)^{1/3},$$

where $P_p$ is the propulsion power estimate and $c_T$ is the hydrodynamic coefficient.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

The present invention relates to a generation of navigational information of a dive. The navigational information relates to, but is not limited to, generating information on a dive performed by a diver, which involves at least a determination of heading and velocity, or speed, of the diver. Additionally, any further information, such as position and diving route related information may be derived from the mentioned pieces of generated information.

Figure 1:
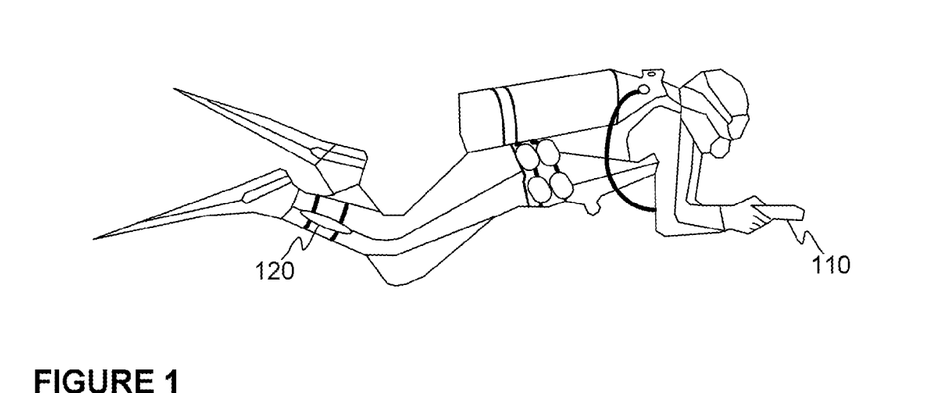
FIG. 1 illustrates schematically an example of the solution according to the present invention.

FIG. 1 illustrates schematically an example of the solution according to the present invention. The solution introduces pieces of equipment providing underwater navigation system to be used in underwater activities. The pieces of equipment, i.e. an underwater navigation device, comprise a user device 110 and a sensor unit 120, which are communicatively coupled to each other. The coupling may be arranged in a wired or a wireless manner by using a known communication technology for this kind of application. The currently used wireless underwater communication technologies are ULF (Ultra Low Frequency) electromagnetic radio communication, acoustic ultrasound communication and optical (blue light) communication, which all may be applied with the present invention. In the description herein the communication is arranged in a wireless manner and the mentioned pieces of equipment are equipped with necessary communication means, such as receivers, transmitters and antennas, for implementing the communication. Moreover, both pieces of equipment comprise necessary and applicable battery for providing power for the equipment in question and any internal units, such as charging connectors, therein. Additionally, at least the user device 110 comprises an internal oscillator for providing a clock signal for one or more units within the user device. Moreover, the sensor unit 120 may comprise an own oscillator, which is advantageously synchronized with the oscillator in the user device 110. Preferably, both pieces of equipment comprise waterproof housings due to application environment of the system and necessary fastening means, such as straps.

The user device 110 as illustrated in FIG. 1 in an exemplified manner is integrated to scuba diving equipment. Thus, it may be arranged to provide additional information, such as an amount of gas left, together with the navigational information according to the present invention. However, the user device 110 according to an example of the present invention may be distinct unit to other scuba diving equipment. For example, the user device 110 may be a wrist-computer type of solution configured to perform tasks for navigation, as will be described.

Figure 2:
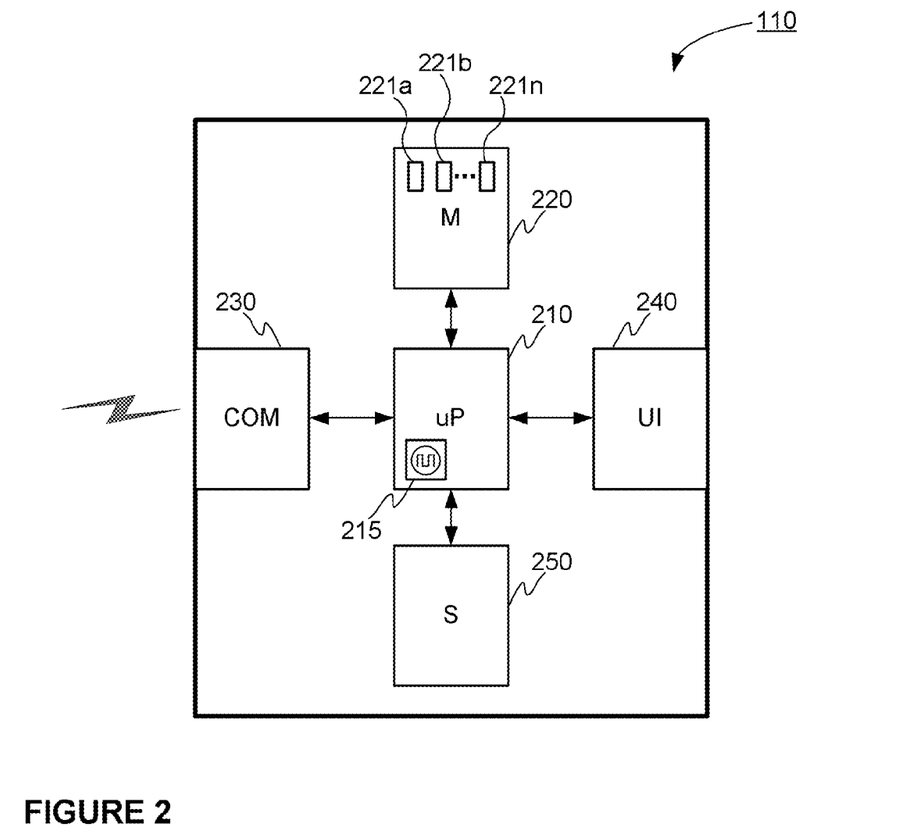
FIG. 2 illustrates schematically a user device according to an example of the invention.

FIG. 2 illustrates schematically, as an example, the user device 110 according to the invention. The user device 110 comprises one or more processors 210, one or more memories 220 being volatile or non-volatile for storing portions of computer program code 221a-221n and any data values, a communication interface 230 with the communication means and one or more user interface units. Additionally, the user device 110 may comprise one or more sensors 250 as well as other units according to need. An example of other unit may be, but is not limited to, external memory card connector. The mentioned units within the user device are communicatively coupled with each other either directly or indirectly e.g. through the processor 210, as illustrated in FIG. 2. Thus, the user device comprises a communication channel, such as a data bus, between the mentioned units in order to enable the communication. In the following the invention is described so that it is referred to only one processor and only one memory in order to maintain the clarity in the description. However, as already mentioned the user device 110 may comprise more than one processors and more than one memory arranged to interwork together. The user device 110 may be a totally separate device for implementing the present invention or the user device 110 may comprise some other functionalities integrated to cooperate with the present invention. The processor 210 may comprise an internal clock circuit 215, or it may receive the clock signal from an external circuit residing e.g. in the user device 110.

The processor 210 of user device 110 is configured to control the operation of the user device 110. The controlling may be achieved by arranging the processor 210 to execute at least some portion of computer program code 221a-221n stored in the memory 220 causing the control operations by the processor 210. The processor 210 is thus arranged to access to the memory 220 and retrieve and store any information therefrom and thereto. Moreover, the processor 210 is configured to control the communication through the communication interface 230 at least with the sensor unit 120 and any additional units. The processor 210 is also configured to control a delivery of information, i.e. data, to and from user interface units 240. The user interface units 240 comprise at least a display, or a touch display, and additionally one or more units from the following list: input buttons, rotary controls, sound producing devices, tactile haptic devices. Additionally, the processor 210 may be arranged to obtain information from any sensor 250 arranged in the user device, such as from a pressure sensor for deriving information on diving depth or water salinity sensor providing information on the water type. The processor 210 may also be configured to control storing of calculated information, as will be described later, in order to produce navigational information. For sake of clarity, the processor herein refers to any unit suitable for processing information and control the operation of the device, among other tasks. The mentioned operations may e.g. be implemented with a microcontroller solution with embedded software.

Figure 3:
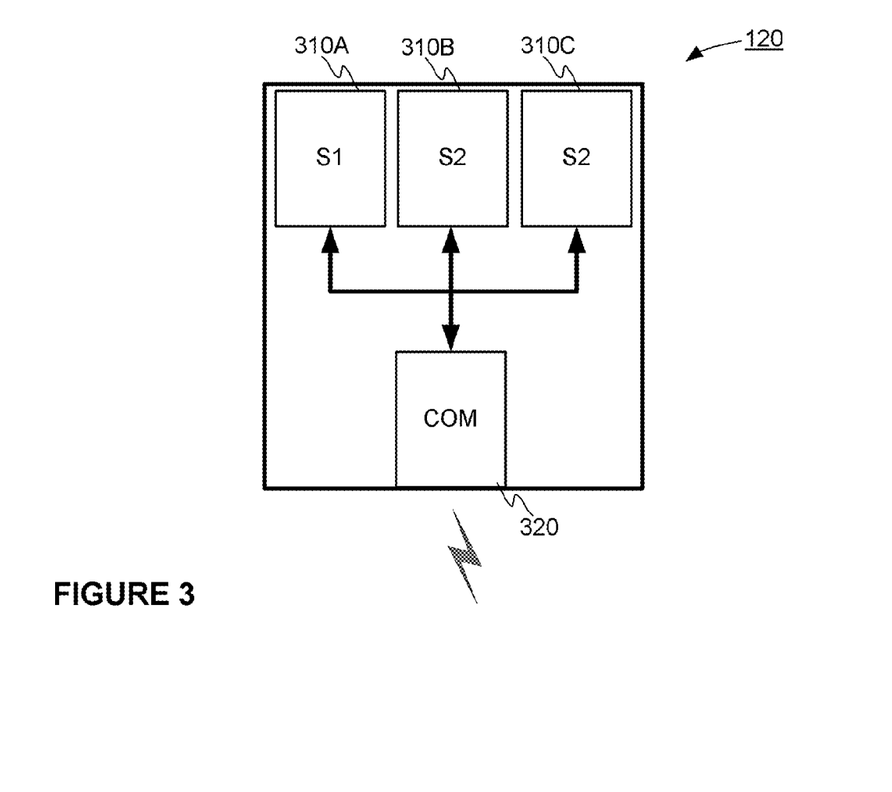
FIG. 3 illustrates schematically a sensor unit according to an example of the invention.

The sensor unit 120, as depicted in FIG. 3, comprises multiple sensors 310A-310N selected for providing information for underwater navigation. The information from sensors is configured to be delivered through a communication interface 320 comprising communication means which is communicatively coupled to the communication interface 230 residing in the user device 110.

According to an example of the invention the sensor unit 120 comprises a set of inertial sensors. The inertial sensors according to an example of the present invention may comprise, but are not limited to, magnetometer 310A, gyroscope 310B and accelerometer 310C. The magnetometer 310A is configured to provide information on a direction and magnitude of the magnetic field at a point in space, which in this case mainly refers to earth's magnetic field, which thus enables a derivation of directional information for the underwater navigation at any point of time. Examples of magnetometers are, but not limited to, Hall sensor or compass. The gyroscope 310B is configured to provide information on orientation, based on the principles of angular momentum, of the device into which it is mounted. The accelerometer 310C, in turn, is configured to measure proper acceleration of the device into which the accelerometer is mounted, when the device, such as sensor unit, moves. Both the gyroscope 310B and the accelerometer 310C according to the present example operate in 3-dimensional space. Additionally, the sensor unit 120 may comprise temperature sensor for deriving the temperature of the water. Naturally, the sensor unit 120, and/or the sensors themselves, comprises energy source in order to enable the operation of the sensor unit 120 as described.

In some other implementation of the present invention the sensor unit 120 may comprise only an accelerometer 310C and magnetometer 310A as described above. By means of these two sensor it may be possible to derive necessary information according to an example of the present invention, as will be described. However, in order to achieve a proper operability of the system, the number and type of sensors shall be selected according to the need. Furthermore, in some implementations the sensors, or not at least all of them, are operative in 3D space, but only in 1D or 2D. With an optimal combination of 1 D, 2D and 3D sensors the desired outcome may be achieved.

Figure 4:
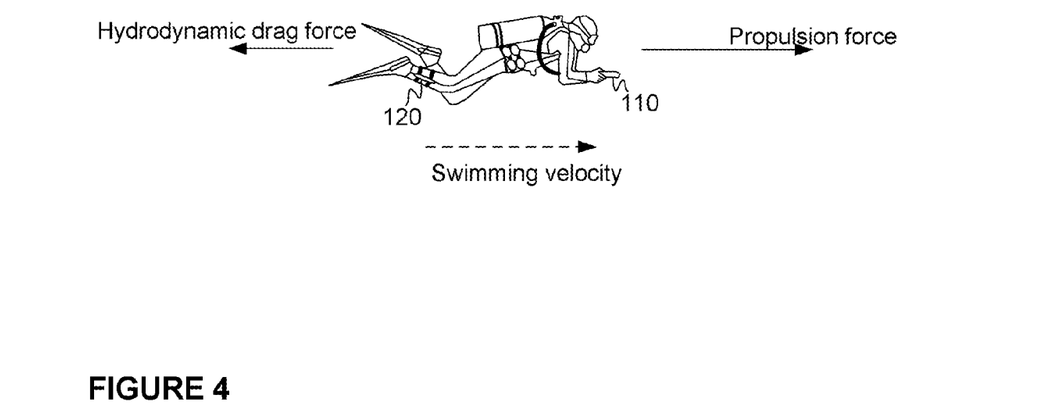
FIG. 4 illustrates schematically a principle of the present invention.

The present invention is based on an idea in which diver's swimming velocity is derived in an inventive manner and combining the information with heading information one may produce navigational information. The diver's swimming velocity according to the present invention is configured to be defined so that a propulsion force the diver produces for propagation and a hydrodynamic drag force resisting the propagation of the diver in underwater are calculated in order to evaluate the velocity of the diver at a specific point of time. The propulsion force is calculated from the estimated propulsion power as seen in equation (1). In other words, at least some counterforces, as depicted in FIG. 4, having effect to diver's propagation are calculated and based on these the velocity may be defined.

According to an embodiment of the present invention the propulsion power may be calculated by taking into account at least swimming movement related aspects. In other words, the user device 110 may be configured to calculate a type and the amplitude of swimming kick by means of data obtained from at least one sensor, such as an accelerator sensor, residing in the sensor unit 120. For each possible swimming kick type a coefficient of power is determined to be used in propulsion power calculation. Generally known, and typical, swimming kick types of scuba divers e.g. are

- A flutter kick, which is performed by alternating moving diver's legs up and down, much like when swimming freestyle.
- A backward flutter kick, which involves sticking fin straight back and then turning ankle downward and pulling back towards the body.
- A frog kick or sculling kick, which is similar to a kick a swimmer does when swimming the breast stroke.
- A reverse frog kick is the same kick as the frog kick but done backwards. It is used when the diver wants to stop, or to take underwater photographs.
- A variation on the frog kick is known as a helicopter turn. A helicopter turn is useful for rotating your body without forward movement.
- A Dolphin kick, which is performed by moving your legs up and down simultaneously.

Each of the above listed kick types may be recognized by the user device 110 from data obtained from sensors residing in the sensor unit 120. More specifically, data measured with the inertial sensors may be utilized in the determination of kick type in each case. The determination is advantageously based on a comparison of a detected trajectory of each kick and/or acceleration relating to the trajectory in question with pre-stored information relating to the mentioned kick types. The comparison and classification is based on calculated cross-correlation coefficients between the recorded trajectory and the pre-stored reference trajectories of each type of kick. In response to the comparison the user device 10 outputs the kick type performed by the diver and retrieves a unique coefficient of power predefined for each, or at least some, of the kick types. The unique coefficient may be a statistical value obtained from studies within the area or it may be calculated individually for each diver during a setup of the system through testing each kick by the diver in question and measuring the achieved effect. Moreover, according to some embodiment of the invention the system may be arranged to retrieve the coefficient of power by taking into account diver's physical values, such as length and weight, and/or some other information, such as the amount of diving experience and if the diver goes in for sports or not. These pieces of information may be input to the device during the setup, for example. As said, the coefficients of power may be stored in a memory within the user device 110 in a data structure from which the coefficients may be retrieved by the processor in order to calculate the propulsion power at a point of time.

According to another embodiment of the present invention some additional parameters, in addition to the kick type, may be also monitored with the same or with any additional sensor unit, if needed. For example, typically e.g. hand or arms do not produce any propulsion power in scuba diving due to a fact that hands are not used for propagation. However, in case of some new diving motion is invented, an applicable sensor unit may e.g. be fastened to the arm and a similar detection of any movement and definition of coefficients of power may be implement for hand movements. The same applies to any other body part if needed. Moreover, if a diver is using some external device, such as a diving scooter, the propulsion power of such a device may be input to, or measured by, the system and thus it is taken into account when calculating the complementary propulsion force of a diver.

The propulsion power estimate $P_p$ can be calculated by multiplying the coefficient of power of the kick type with the measured kick amplitude squared.

All in all, the propulsion force may be calculated with an equation:

$$F_p = \frac{P_p}{v_p}, \qquad (1)$$

where $F_p$ is the propulsion force, $P_p$ is the propulsion power estimate and $v_p$ is the object propulsion velocity. Naturally, the propulsion power comprises all possible sources providing propulsion power, and thus force, for the diver.

Next the calculation of hydrodynamic drag force is described. As mentioned, the hydrodynamic drag force is the counterforce to propulsion force in the calculation of the diver's velocity for navigational purposes. A magnitude of the hydrodynamic drag force of a body may be dependent at least on a shape and wet surface area of a body, but also on the velocity of the body, according to the following expression:

$$F_d = c_T v_f^2 \qquad (2)$$

, where $F_d$ is the drag force, $c_T$ is the total hydrodynamic drag coefficient and $v_f$ is the flow velocity. The total hydrodynamic drag coefficient is the product of all the constant factors affecting the drag such as the density and viscosity of water, the wetted surface area of the diver and the gear and the effect of the hydrodynamic shape and surface quality of the diver and the diving gear. The effect of the shape and the surface of the body may be taken into account through the hydrodynamic drag coefficient $c_T$. This coefficient may e.g. be determined from experimental data. For example, it may be defined for the diver per each different diving gear set. The diver may e.g. input the gear set through user interface within the user device prior to the dive and the system is configured to retrieve a corresponding hydrodynamic coefficient from a memory of the user device 110. The value of the hydrodynamic coefficient varies significantly from diver to diver based on diver body shape and size and the diving skill and the experience of the diver. The difference between inexperienced and experienced diver can be over 25%. The used gear set has also a significant effect on the coefficient. Change from wetsuit to drysuit increases the coefficient typically by 30% and adding an extra air tank adds another 30% to the hydrodynamic drag coefficient. It is crucial that the diver selects the correct hydrodynamic coefficient before the dive for the system to be able to measure and record the underwater speed and distances accurately. In a preferred embodiment of the invention the system comprises an interactive selection process by means of which the user may input information on his/her gear and any other parameters, such as experience in diving, into the system, the input information at least relating to the determination of the hydrodynamic coefficient. Based on the input information the system is configured to select the most applicable hydrodynamic coefficient to be used with the diver in question. For example, the selecting of hydrodynamic coefficient may be based on calculation in which a total value is mathematically calculated, e.g. by summing the input values, and a corresponding hydrodynamic coefficient is retrieved from a data structure stored in the system. Furthermore, the total value may be determined by providing weighted values for parameters input and calculating the total value from the weighted values. In such a manner it is possible to emphasize an effect of at least some input parameters.

According to some embodiment of the present invention the hydrodynamic coefficient may also be determined by swimming underwater a known distance using the specific equipment set and inputting the known true distance by using the user interface or for example by using a surface satellite navigation system before the dive and after the dive to measure the start and end positions to calculate the true reference distance. The hydrodynamic coefficient can then be adjusted mathematically to make the distance measured by the inertial underwater navigation system to match the true reference distance.

It is assumed that at a certain point of time the diver propagates at a constant velocity and in such a case the propulsion force is equal to drag force $F = F_p = F_d$ and the object propulsion velocity is thus equal to flow velocity $v = v_p = v_f$. Thus, combining equations (1) and (2) with that information we receive that diver's velocity in water may be derived from:

$$v = \left(\frac{P_p}{c_T}\right)^{1/3},$$

where $P_p$ is the propulsion power estimate and $c_T$ is the total drag coefficient.

With the velocity information it is possible to calculate the distance the diver propagates in a period time and, thus, the distance information may be derived for producing and providing the navigational information.

As the underwater dive is performed in three dimensional space it is advantageous to take into account a spatial information in the generation of navigational information. According to such an embodiment the depth information is configured to be obtained from information obtained from a pressure sensor residing in the user device 110 or in the sensor unit 120 and taken as an input into the generation of navigational information. The depth information may advantageously be utilized in the production of speed and heading information, as it is important factor in 3D space in underwater.

According to an embodiment of the invention the solution comprises a method for mitigating an effect of sea currents as an error source in underwater navigation. Namely, sea currents are common in many diving spots and the effect of those can be huge to a diver. Thus, according to an embodiment of the present invention a sea current compensation mode is established in the user device, which can either be activated manually by the diver or automatically in response to recognition of the sea current by the user device or sensor unit. More specifically, the mitigation of the effect of the sea current may be achieved by executing current compensation measurement so that the diver swims against the current keeping her/himself stationary to a non-moving reference point, such as bottom, boat or anchor rope and activating the sea current compensation mode on the user device. The system measures the diver average swimming speed and heading "water referenced velocity" during the sea current compensation mode. As the diver is not moving in reference to the ground, the "ground referenced velocity" is zero. The sea current velocity may be calculated by reversing the direction of the measured "water referenced velocity" The calculated sea current velocity is then used in the navigation algorithm to compensate for the velocity error induced by the sea current. The calculated sea current velocity value is used until the diver activates a new sea current compensation measurement or when the user sets the sea current compensation to zero.

When the diver experiences a non-moving situation, for example a decompression stop, the information of the non-moving situation can be used to enhance the navigation accuracy of the system and to reduce the drift error present in all inertial navigation systems. According to an embodiment of the invention the diver may activate a zero velocity update measurement in the user device. When the zero velocity update mode is activated, the navigation algorithm sets the ground referenced velocity measurement value to zero for as long as the mode is active. During the zero velocity compensation mode the position coordinates are kept constant in the inertial navigation integrator, which is a logic collecting and integrating the obtained information from sensors and any other information e.g. input through specific modes of the system. When the user exits the zero velocity update mode the inertial navigation integrator may continue its operation from a known zero velocity starting point.

Now, as the underwater navigation system is configured to collect the propagation related information as described, depth information e.g. by the hydrostatic pressure sensor and heading information from magnetic sensor, like compass, the system may derive the navigational information from the derived pieces of information. The pieces of information, such as velocity and heading, may be combined on a basis of time information received from the internal clock signals in order to generate the navigational data. Moreover, any derivative from the velocity and heading may be determined as navigational information. Furthermore, the navigational information may be output graphically and/or numerically during the dive so that the diver receives information e.g. on his position in relation to the starting point, or any other point in underwater, which may be input to the system. The starting point may be input and stored either manually by the diver, when he/she descends into underwater or automatically in response to a predetermined phenomenon, e.g. when the depth sensor provides information indicating that the diver has started the dive i.e. the hydrostatic pressure sensor provides pressure information deviating from atmospheric pressure. Alternatively or in addition, the underwater navigation system may comprise a receiver operating with the Global Positioning System (GPS), or any similar navigation system providing information on geographical position. The information may also be input manually e.g. by the diver if he/she receives the information any other source of information. In such a case the underwater navigation system may store the geographical position before the dive and produce the underwater navigational information with respect to that position.

Figure 5:
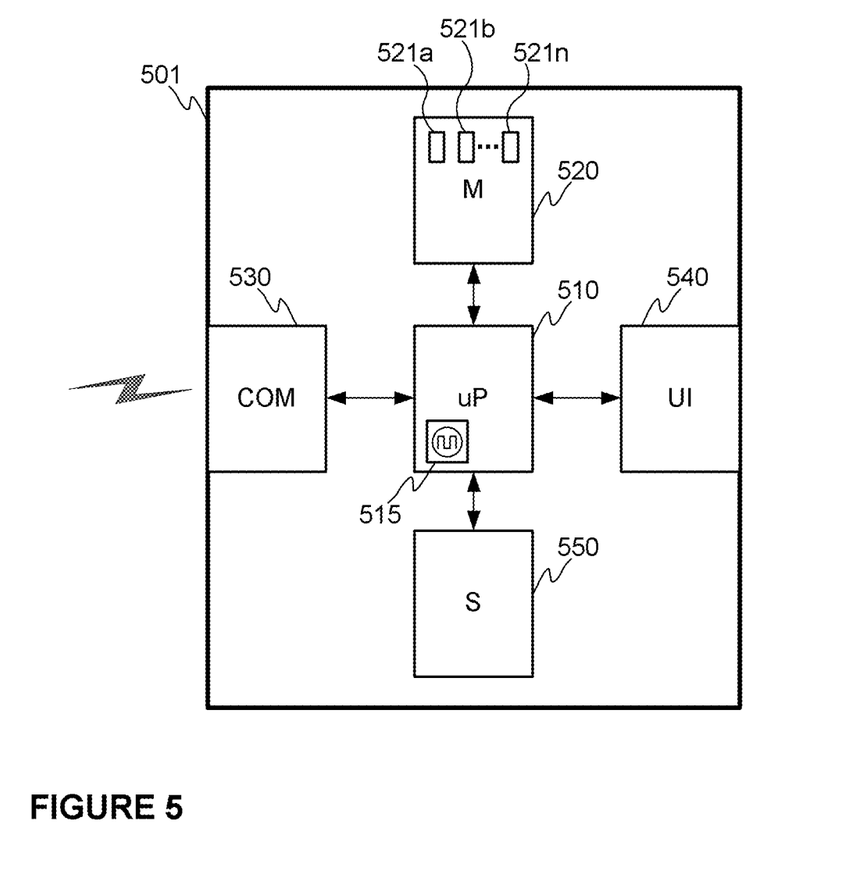
FIG. 5 illustrates schematically a sensor unit according to another example of the invention.

In the description above it is mainly disclosed that the solution according to an embodiment of the invention is implemented within the user device 110 obtaining information, either wirelessly or in a wired manner, from the sensor unit 120. According to another embodiment of the invention a sensor unit may be configured to perform at least part of the processing of information in order to generate at least some pieces of information defining navigational information. An example of such a sensor unit 501, i.e. apparatus, is illustrated in FIG. 5. The sensor unit 501 comprises one or more processors 510, one or more memories 520 being volatile or non-volatile for storing portions of computer program code 521a-521n and any data values, a communication interface 530 and one or more user interface units 540. Additionally, the sensor unit may comprise one or more sensors 550 as well as other units according to need. An example of other unit may be, but is not limited to, external memory card connector. The mentioned units within the user device are communicatively coupled with each other either directly or indirectly e.g. through the processor 510, as illustrated in FIG. 5. Thus, the sensor unit comprises a communication channel, such as a data bus, between the mentioned units in order to enable the communication. The processor 510 may comprise an internal clock circuit 515, or it may receive the clock signal from an external circuit residing in the sensor unit 501.

The processor 510 of sensor unit 501 may be configured to control the operation of the sensor unit. The controlling may be achieved by arranging the processor 510 to execute at least some portion of computer program code 521a-521n stored in the memory 520 causing the control operations by the processor 510. The processor 510 is thus arranged to access to the memory 520 and retrieve and store any information therefrom and thereto. Moreover, the processor 510 is configured to control the communication through the communication interface 530 with any external unit, such as with a user device. The processor 510 may also be configured to control a delivery of information, i.e. data, to and from user interface units 540. The user interface units 540 may e.g. comprise input and output means, such as switches, connectors and indicators applicable for the sensor unit 501. Additionally, the processor 510 may be arranged to obtain information from any sensor 550 arranged in the sensor unit, such as from any inertial sensors as introduced earlier and/or from a pressure sensor for deriving information on diving depth or water sensor providing information on the water type. The processor 510 may also be configured to control storing of obtained and calculated information, as will be described later, in order to produce information defining at least some navigational information. Thus, the processor 510 may be configured to process information obtained from the sensors 550 and stored in the memory 520 in order to produce at least some pieces of navigational information. For sake of clarity, the processor herein refers to any unit suitable for processing information and control the operation of the apparatus, among other tasks. The mentioned operations may e.g. be implemented with a microcontroller solution with embedded software.

According to the embodiment of the invention wherein the sensor unit 501 is configured to calculate at least some of the navigational information through processing of information obtained from sensors 550 it may be arranged that the navigational information is transmitted to the user device through the communication interface 530 as a ready-to-output. The advantage of this kind of solution is that the processing resources for calculation of navigational information may be arranged in the sensor unit 501 and the processing unit in the user device may be optimized for other functions. Additionally, the communication between the user device and sensor unit may be optimized especially in a situation wherein the communication is arranged wirelessly.

Figure 6:
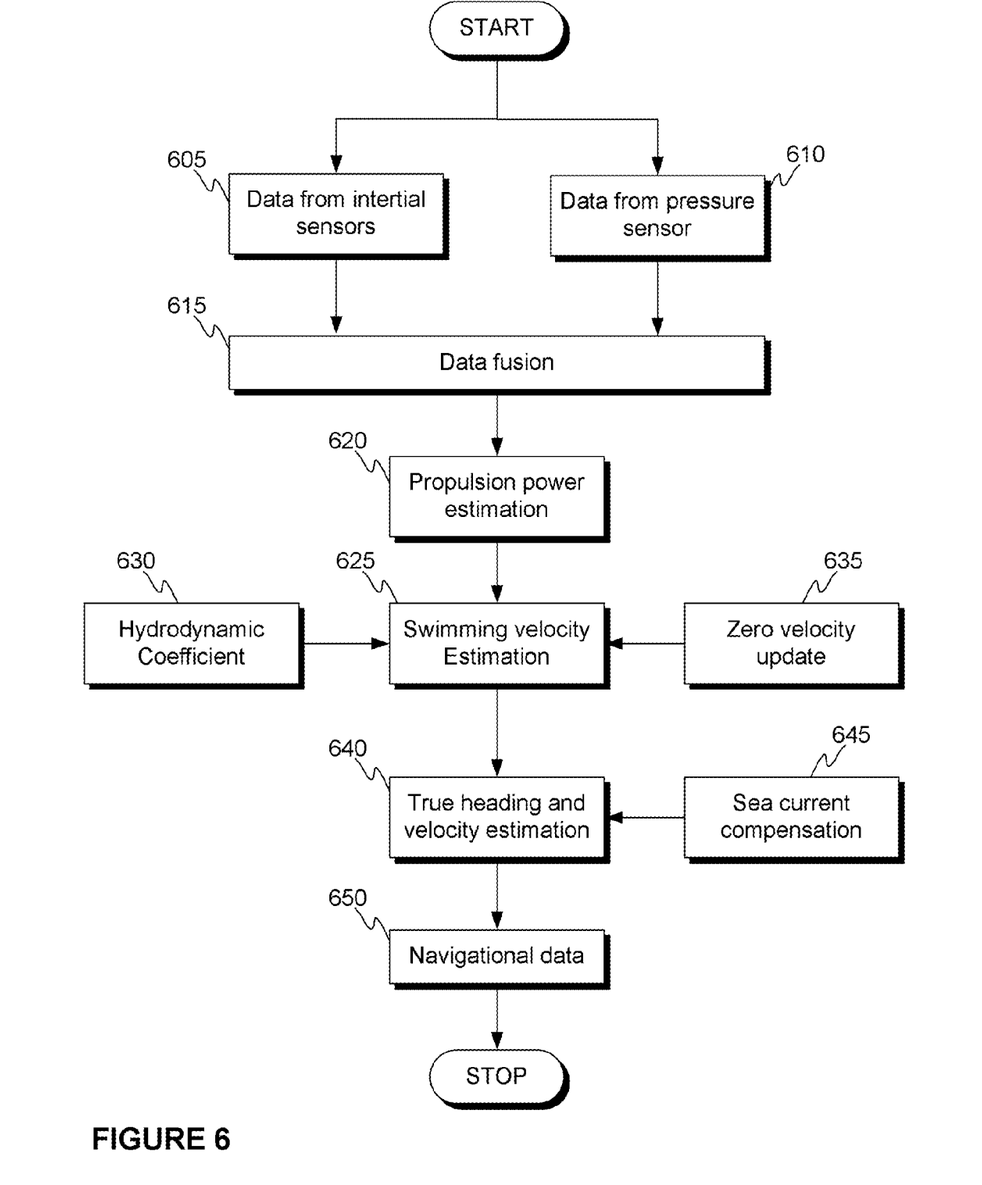
FIG. 6 illustrates schematically an example of the method according to the invention.

FIG. 6 illustrates, as an example, a method according to an embodiment of the invention. In the method the system obtains data from inertial sensors 605 and measurement data from at least one pressure sensor 610. The system is configured to perform a data fusion 615 to the obtained measurement data, which at least comprises a step of combining pieces of measurement information so that it is possible to derive obtained measurement information on specific coordinate system and represented in the required physical quantities. In the next phase a propulsion power is estimated 620 on a basis of obtained information from the sensors data fusion, as discussed above. The estimation of propulsion power may comprise, but is not limited to, recognition of kick types the diver has performed. Furthermore, in some implementations of the present invention maneuver recognition may be included in the propulsion power estimation, as maneuvers the diver performs may have effect on propulsion power. The zero buoyancy under water allows the diver to perform a number of maneuvers, for example barrel rolls or outside loops, during the dive. The maneuver recognition may advantageously be performed in a similar manner as the kick type recognition i.e. some predefined maneuver patterns are stored and data obtainable from the sensors is compared to the maneuver patterns in order to detect any pattern from the diver movement, and thus the effect may be taken into account in the estimation of the propulsion power. Next, the swimming velocity is estimated 625 by taking into account at least the hydrodynamic coefficient 630 determined e.g. on a basis of user input data, as discussed earlier. Moreover, some additional factors, such as zero velocity update information 635 may be taken into account in the estimation of the swimming velocity. Finally, the true velocity estimation 640 may be derived with the heading information obtained from inertial sensors. In some implementation of the invention for the calculation of the true velocity the sea current compensation 645 may be taken into account if such information is obtained during the dive. The effect of the sea current may be compensated by summing the velocity value calculated in the sea current compensation mode from the estimated velocity of the user calculated from the propagation information. Finally, the system may generate the navigational data 650, such as velocity and heading in a function of time. Additionally, any further information, such as position and diving route related information may be derived from the mentioned pieces of generated information. Depending on the implementation of the apparatus according to the invention the method may at least partly be implemented in the user device 110 or in the sensor unit 501.

Worthwhile to notice is that the magnetometer, such as compass, is preferably, and inventively, coupled in the sensor unit according to one or more embodiments of the invention. This is advantageous when the application area of the invention is diving. As already mentioned, the divers carry one or more gas tanks and they are typically made of metal. The effect of metal tanks to the operation of magnetometer may be even as much as 10 degrees of compass angle, which may be, at least partly, be eliminated by arranging the magnetometer in the sensor unit, which is at a distance from the metallic gas tanks.

A further advantage of the present invention is that it provides a tool for estimating distance the diver may swim with an amount of breathing gas currently in the tanks. This may be achieved by utilizing dive monitoring and navigation related devices, such as dive computers, which can calculate the amount of breathing gas available by using information of the gas pressure and the volume of the breathing gas tanks. Thus, the devices can calculate breathing gas sufficiency called remaining bottom time based on the ambient temperature and depth, gas pressure, gas consumption rate, decompression information and the volume of the breathing gas. By combining the present invention with the breathing gas information it is possible to determine a distance, which still can be swum. More specifically, the navigational information, such as such as the diver velocity, or speed, and heading and the velocity of sea current, generated during the dive may be combined with the measured amount of available breathing gas to calculate the maximum available distance for different diver swimming speed, heading and depth combinations. This information may assist the diver in decision making when he/she is controlling his/her swimming speed and deciding between different route options underwater.

In the description above it is mainly referred that the velocity calculation is performed through determination of propulsion force and hydrodynamic drag force. However, the same may be achieved by utilizing corresponding energies or powers in the determination of the velocity.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

What is claimed is:

1. A method for generating underwater navigational information, comprising the steps of:
   receiving input data from a user;
   obtaining inertial data from inertial sensors;
   calculating an estimation of a propulsion power produced by the user carrying an apparatus at a predetermined points of time at least partly based on the obtained inertial data, the calculation of the estimation on the propulsion power comprises a step of recognizing a swimming kick type performed by the user based on acceleration information obtained from inertial data;
   calculating a hydrodynamic coefficient for the user at least partly based on the input data by the user;
   calculating a velocity of the user at least partly on a basis of the estimated propulsion power and the determined hydrodynamic coefficient at the predetermined points of time;
   calculating heading information of the user at the predetermined points of time from the obtained inertial data; and
   generating navigational information at least by combining the calculated velocity information with the calculated heading information at corresponding points of time.

2. The method of claim 1, wherein, the user is a diver swimming underwater and carrying an underwater navigation device communicatively coupled to the inertial sensors, the inertial sensors being attached to the diver, the underwater navigation device comprising a computer device comprising one or more processors, one or more memories storing portions of computer program code and data values, a communication interface, and one or more user interface units, the one or more user interface units comprising at least a display, the computer device configured to perform navigation tasks,
   the computer device performs the calculation of the estimation on the propulsion power recognizing the swimming kick type performed by the diver based on the acceleration information obtained from inertial data, and
   the computer device controls a delivery of information to the user interface unit of the underwater navigation device.

3. The method of claim 1, further comprising a step of setting a ground referenced velocity measurement value to zero in response to detection of an activation of zero velocity compensation mode.

4. The method of claim 1, further comprising a step of compensating an effect of a sea current by measuring user's average swimming velocity and heading in response to an activation of a sea current compensation mode and summing an effect detected in the sea current compensation mode to velocity and heading information calculated on the basis of obtained inertial data.

5. An apparatus for generating underwater navigational information comprising:
   at least one processor; and
   at least one memory including computer program code,
   the processor being configured to cause the apparatus at least to perform:
   receive input data from a user,
   obtain inertial data from inertial sensors,
   calculate an estimation of a propulsion power produced by the user carrying the apparatus at a predetermined points of time at least partly based on the obtained inertial data, the calculation of the estimation on the propulsion power comprises a recognition of a swimming kick type performed by the user based on acceleration information obtained from inertial data,
   calculate a hydrodynamic coefficient for the user at least partly based on the input data by the user,
   calculate a velocity of the user at least partly on a basis of the estimated propulsion power and the determined hydrodynamic coefficient at the predetermined points of time,
   calculate heading information of the user at the predetermined points of time from the obtained inertial data, and
   generate navigational information at least by combining the calculated velocity information with the calculated heading information at corresponding points of time.

6. The apparatus of claim 5, wherein the apparatus is configured to receive information relating to diving equipment of the user as an input from the user.

7. The apparatus of claim 5, wherein the inertial sensors comprise at least an accelerator sensor and a magnetometer.

8. The apparatus of claim 5, wherein,
   wherein the inertial sensors comprise at least an accelerator sensor, and
   the apparatus is configured to recognize a swimming kick type performed by the user based on acceleration information obtained from the accelerator sensor.

9. The apparatus of claim 5, wherein the apparatus is configured to calculate the velocity of the user at a predetermined point of time with an equation:

$$v = \left(\frac{P_p}{c_T}\right)^{1/3},$$

where $P_p$ is the propulsion power estimate and $c_T$ is the hydrodynamic coefficient.

10. The apparatus of claim 5, wherein at least part of the inertial data is configured to be obtained from an external device to the apparatus through a communication interface arranged in the apparatus.

11. The apparatus of claim 5, wherein the apparatus is one of the following: a user device, and a sensor unit.

12. The apparatus of claim 5, wherein,
the at least one processor, and the at least one memory including the computer program code are located within an underwater navigation device configured for underwater use by a diver, the underwater navigation device including a user interface unit,
the apparatus further includes a sensor unit that attaches to the diver and, during underwater swimming by the diver, is communicatively coupled with the underwater navigation device, and
the at least one processor is further configured to control a delivery of information to the user interface unit of the underwater navigation device, the user interface unit comprising at least a display.

13. A system for generating underwater navigational information, the system comprising
a user device; and
a sensor unit,
the user device and the sensor unit being communicatively coupled to each other,
wherein the system is configured to:
receive input data from a user,
obtain inertial data from inertial sensors,
calculate an estimation of a propulsion power produced by the user carrying an apparatus at a predetermined points of time at least partly based on the obtained inertial data, the calculation of the estimation on the propulsion power comprises a recognition of a swimming kick type performed by the user based on acceleration information obtained from inertial data;
calculate a hydrodynamic coefficient for the user at least partly based on the input data by the user,
calculate a velocity of the user at least partly on a basis of the estimated propulsion power and the determined hydrodynamic coefficient at the predetermined points of time,
calculate heading information of the user at the predetermined points of time from the obtained inertial data, and
generate navigational information at least by combining the calculated velocity information with the calculated heading information at corresponding points of time.

14. The system of claim 13, wherein the system is configured to receive information relating to diving equipment of the user as an input from the user.

15. The system of claim 13, wherein the inertial sensors comprise at least an accelerator sensor and a magnetometer.

16. The system of claim 13, wherein the system is configured to recognize a swimming kick type performed by the user based on acceleration information obtained from the accelerator sensor.

17. The system of claim 13, wherein the system is configured to calculate the velocity of the user at a predetermined point of time with an equation:

$$v = \left(\frac{P_p}{c_T}\right)^{1/3},$$

where $P_p$ is the propulsion power estimate and $c_T$ is the hydrodynamic coefficient.

18. The system of claim 13, wherein,
the user device comprises at least one processor, at least one memory including computer program code, and a user interface unit comprising at least a display, the user device configured for use by a diver swimming underwater,
the sensor unit attaches to the diver and, during underwater swimming by the diver, is communicatively coupled with the user device, and
the user device is configured to generate the navigational information and control a delivery of information to the user interface unit.

* * * * *